(12) United States Patent
Thompson et al.

(10) Patent No.: US 11,131,202 B2
(45) Date of Patent: Sep. 28, 2021

(54) ANNULUS FILLER

(71) Applicant: ROLLS-ROYCE plc, London (GB)

(72) Inventors: Ewan F Thompson, Derby (GB); Elliot Carty, Derby (GB)

(73) Assignee: ROLLS-ROYCE plc, London (GB)

( * ) Notice: Subject to any disclaimer, the term of this patent is extended or adjusted under 35 U.S.C. 154(b) by 677 days.

(21) Appl. No.: 16/161,288

(22) Filed: Oct. 16, 2018

(65) Prior Publication Data
US 2019/0145268 A1 May 16, 2019

(30) Foreign Application Priority Data
Nov. 10, 2017 (GB) .................... 1718600

(51) Int. Cl.
| *F01D 11/00* | (2006.01) |
| *F01D 5/22* | (2006.01) |
| *F01D 5/30* | (2006.01) |
| *B29C 70/68* | (2006.01) |
| *F02K 3/06* | (2006.01) |

(52) U.S. Cl.
CPC .............. *F01D 5/225* (2013.01); *B29C 70/68* (2013.01); *F01D 5/3007* (2013.01); *F01D 11/008* (2013.01); *F02K 3/06* (2013.01); *F05D 2220/36* (2013.01); *F05D 2240/57* (2013.01); *F05D 2300/44* (2013.01); *F05D 2300/603* (2013.01)

(58) Field of Classification Search
None
See application file for complete search history.

(56) References Cited

U.S. PATENT DOCUMENTS

| 5,263,823 A * | 11/1993 | Cabaret ................. F01D 11/006 416/218 |
| 5,277,548 A * | 1/1994 | Klein .................... F01D 11/008 416/193 A |
| 5,464,326 A | 11/1995 | Knott |
| 5,580,217 A * | 12/1996 | Richards ............... F01D 11/006 416/193 A |
| 6,416,280 B1 | 7/2002 | Forrester et al. |
| 9,017,031 B2 * | 4/2015 | Bottome ............... F01D 11/008 416/193 R |
| 2005/0265847 A1 | 12/2005 | Butt et al. |

(Continued)

FOREIGN PATENT DOCUMENTS

| EP | 1340903 A2 | 9/2003 |
| EP | 1557538 A2 | 7/2005 |

(Continued)

OTHER PUBLICATIONS

Apr. 17, 2019 Extended Search Report issued in European Patent Application No. 18203689.7.

(Continued)

*Primary Examiner* — Kayla Mccaffrey
(74) *Attorney, Agent, or Firm* — Oliff PLC (57) ABSTRACT

An annulus filler for mounting to a rotor disc in a gas turbine engine includes a body portion having a top wall arranged to bridge the gap between two adjacent blades extending from the rotor disc and to define an air flow surface for air passing between the blades; and a separately formed rear interface portion, fixed to the body portion adjacent to a down-flow end of the top wall. The rear interface portion forms a lip projecting below the top wall.

19 Claims, 9 Drawing Sheets

(56) References Cited

U.S. PATENT DOCUMENTS

| | | | |
|---|---|---|---|
| 2007/0039310 A1 | 2/2007 | Bil et al. | |
| 2010/0329873 A1* | 12/2010 | Ruba | F01D 5/3015 |
| | | | 416/220 R |
| 2013/0266447 A1* | 10/2013 | Evans | F01D 5/30 |
| | | | 416/191 |
| 2014/0186187 A1 | 7/2014 | Lamboy et al. | |
| 2014/0271143 A1 | 9/2014 | Feeney | |
| 2015/0050150 A1* | 2/2015 | Bottome | F01D 11/008 |
| | | | 416/193 A |
| 2015/0354381 A1 | 12/2015 | Congratel et al. | |
| 2016/0160663 A1 | 6/2016 | Mortier et al. | |
| 2016/0195015 A1 | 7/2016 | Little | |

FOREIGN PATENT DOCUMENTS

| | | |
|---|---|---|
| EP | 2154334 A2 | 2/2010 |
| EP | 2463482 A2 | 6/2012 |

OTHER PUBLICATIONS

Apr. 12, 2018 Search Report issued in British Patent Application No. 1718600.8.

\* cited by examiner

ANNULUS FILLER

CROSS-REFERENCE TO RELATED APPLICATIONS

This application is based upon and claims the benefit of priority from British Patent Application Number 1718600.8 filed 10 Nov. 2017, the entire contents of which are incorporated by reference.

BACKGROUND

1. Field of the Disclosure

The present disclosure concerns an annulus filler for mounting to a rotor disc in a gas turbine engine, and a method of manufacturing an annulus filler.

2. Description of the Related Art

Gas turbine engines include a number of rotating fan systems (also referred to as fans). The fans comprise a plurality of radially extending blades mounted on a rotor disc, and may be provided in the compressor stage or turbine stage of the engine, or as the propulsion fan.

To ensure a radially smooth inner surface for air as it passes over the rotor disc, annulus fillers can be used to bridge the gap between adjacent blades. It is known to provide annulus fillers with engagement features for removably attaching the annulus filler to the rotor disc, and with resilient seals between the annulus filler and the adjacent blades.

Annulus fillers can be made from composite materials, by moulding processes such as resin transfer moulding. Such composite annulus fillers are lightweight, and, in the event of damage, may be replaced independently of the blades.

SUMMARY

According to a first aspect there is provided an annulus filler for mounting to a rotor disc in a gas turbine engine, the annulus filler including: a body portion having: a top wall arranged to bridge the gap between two adjacent blades extending from the rotor disc and to define an air flow surface for air passing between the blades; and one or more support components extending from the top wall and configured to fix the annulus filler to the rotor disc; and a separately formed rear interface portion, fixed to the body portion adjacent to a down-flow end of the top wall, wherein the rear interface portion forms a lip projecting below the top wall; and wherein the lip is configured to form an interface with a rear element of or coupled to the rotor disc, such that the top wall and rear element provide a smooth air flow surface.

The rear lip is formed in a separate part to the body. This means that the body portion can be formed by a simple, quick and efficient moulding process, as there are no complex shapes hindering removal of a mandrel around which body portion is formed. This can reduce manufacturing time and cost for making annulus fillers. Furthermore, the rear lip is subject to wear, and so by forming the rear lip on a separate part, only the rear interface portion can be replaced, rather than the whole annulus filler, thus reducing repair costs.

The lip may include a secondary surface extending in the same direction as the top wall of the body portion, and wherein the secondary surface may extend underneath the rear element. The secondary surface helps to retain the annulus filler in position, thus providing a smooth air flow surface.

The secondary surface may include one or more throughholes, such that air can pass from radially above the annulus filler to a volume formed beneath the top wall. The throughholes provide a route for air to reach the space beneath the annulus filler, thus providing cooling for any components beneath it.

The rear interface portion may include an abutment part, arranged to abut an end of the top wall, such that the lip is wholly formed in the rear interface portion. The abutment part means that friction between the annulus filler and rear element only causes wear on the rear interface portion, and not the whole annulus filler.

The rear interface portion may include a bonding lip extending towards the up-flow end of the annulus filler, and underneath the top wall of the annulus filler. Alternatively, the rear interface portion may include a bonding surface extending parallel or substantially parallel to the top wall, and arranged to overlap the top wall. The bonding surface provides increased surface area for fixing the rear interface portion to the body part.

The bonding surface may overlap the top wall on an underside of the top wall. The bonding surface may overlap the top wall above the top wall, and the top wall and bonding surface may be arranged to provide a smooth air flow surface.

The rear interface portion may comprise mounting portions arranged to secure the rear interface portion to the body portion. This makes assembling the two portions of the annulus filler simpler and faster.

A one of the one or more support components includes a pair of sidewalls extending from the top wall. The sidewalls may extend beyond a down-flow end of the top wall, and underneath the rear interface portion, and each mounting portion may include a pair of projections arranged to receive one of the sidewalls between them.

The body portion may comprise a moulded composite material. Moulded composite materials are lightweight and simple to manufacture.

The rear interface portion and body portion may be formed of different materials. The use of different materials allows the rear interface portion to be customised for its particular use.

The rear interface portion may be formed of a material that forms a seal with the rear element. This allows a seal to be formed where the annulus filler engages the rear element, providing a smooth air flow surface.

The rear interface portion may be formed of a material that is compatible with a material of the body portion, in order to join the portions using non-mechanical fixing methods. This allows a bond to be formed between the portions.

The rear interface portion may be formed of a material that is at least as resistant to friction wear than a material of the body portion. The rear interface portion is more susceptible to wear than other parts of the annulus filler, and so making the rear interface portion more resistant to wear increases the overall lifetime of the annulus filler, whilst allowing suitable lightweight materials to be used for the body portion. The material may additionally be selected so as to achieve a certain level of friction with the rear element, thus providing a mechanical damping function.

The rear interface portion may be fixed to the body portion along one or more contact surfaces between the rear interface portion and the body portion.

According to a second aspect, there is provided a gas turbine engine having a propulsion fan, one or more compressor stages and one or more turbine stages, wherein the propulsion fan includes a rotor disc, a plurality of blades arranged circumferentially around the rotor disc, and an annulus filler according to the first aspect provided between each of the blades.

By using the annulus filler of the first aspect, the cost and efficiency of manufacturing the annulus filler, and hence the engine, is improved. Lifecycle costs are also improved, since only a part of the annulus filler will require replacement when worn, rather than the whole annulus filler.

According to a third aspect there is provided a method of manufacturing an annulus filler, the method including: forming a body portion having: a top wall arranged to bridge the gap between two adjacent blades extending from the rotor disc and to define an air flow surface for air passing between the blades; and one or more support components extending from the top wall and configured to fix the annulus filler to the rotor disc; forming a separate rear interface portion; and fixing the rear interface portion to the body portion adjacent to a down-flow end of the top wall, wherein the rear interface portion forms a lip projecting downward from the top wall; and wherein the lip is configured to form an interface with a rear element of or coupled to the rotor disc, such that the top wall and rear element provide a smooth air flow surface.

The rear lip of the annulus filler is formed in a separate part to the body. This means that the body can be formed by a simple, quick and efficient moulding process, as there are no complex shapes hindering removal of a mandrel around which the annulus filler is formed. This can reduce manufacturing time and cost for making annulus fillers. Furthermore, the rear lip is subject to wear, and so by forming the rear lip on a separate part, only the rear interface portion can be replaced, rather than the whole annulus filler.

Forming the body portion may comprise forming the body portion by a moulding process, using a rigid mandrel in a volume underneath the top wall. The moulding process may comprise resin transfer moulding. Moulding processes are simple and low cost, and allow lightweight parts to be formed easily.

The mandrel may comprise a single unitary piece. The method may comprise: after forming the body portion and prior to fixing the rear interface portion to the body portion, withdrawing the mandrel in a down-flow direction, with respect to the top wall.

Using a single piece mandrel makes removal of the mandrel easy, and reduces the risk of defects at joints between different parts of the mandrel.

Forming the body portion may include: forming the body portion with the top wall extending to the down-flow end of the annulus filler; and removing a portion of the top wall, adjacent the down-flow end. Forming the body portion in this way makes the moulding process simpler, and thus more efficient. Furthermore, the part removed may form part of the natural edge of the moulded part, which may require removal to provide a clean finish.

Fixing the rear interface portion to the body portion may comprise fixing the rear interface portion to the body portion along one or more contact surfaces between the rear interface portion and the body portion. This may provide a good connection between the portions, reducing weakness at the joins.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
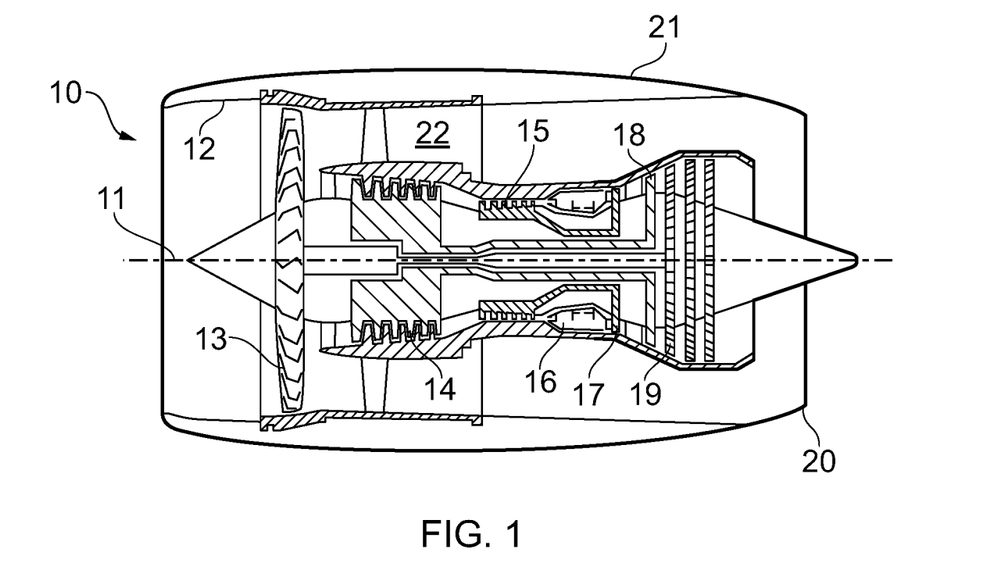
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2A:
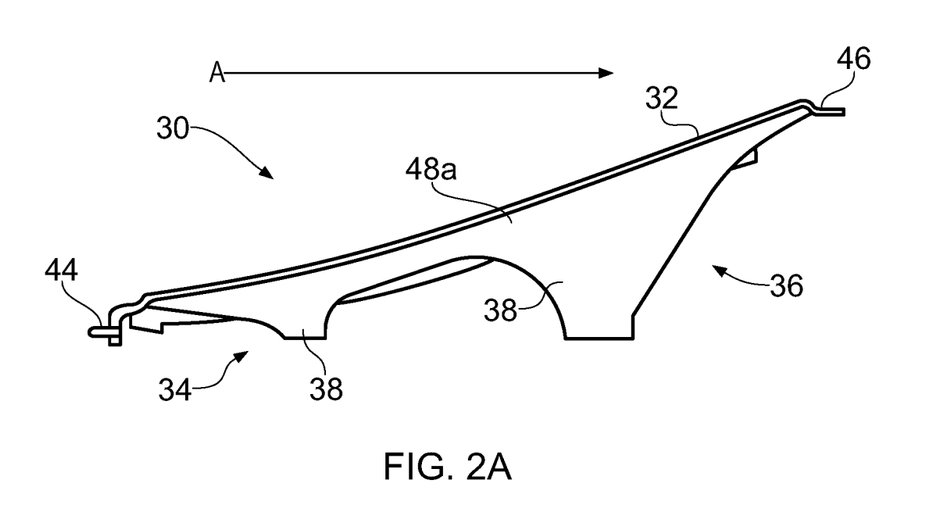
FIG. 2A is side view of an annulus filler.
Figure 2B:
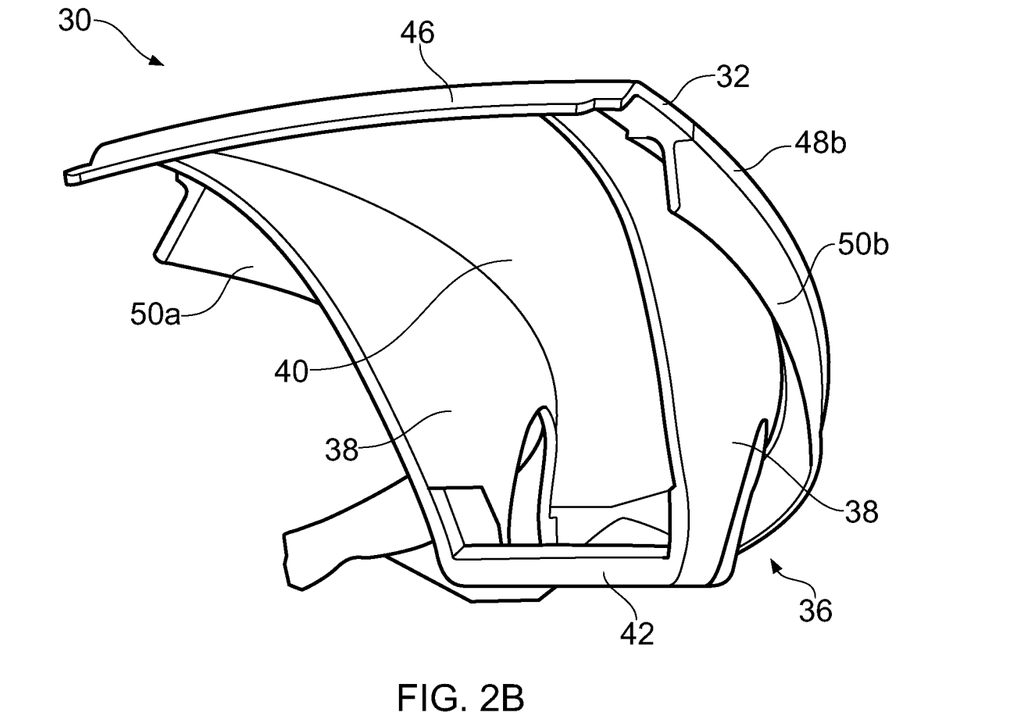
FIG. 2B is a rear view of the annulus filler of FIG. 2A.
Figure 2C:
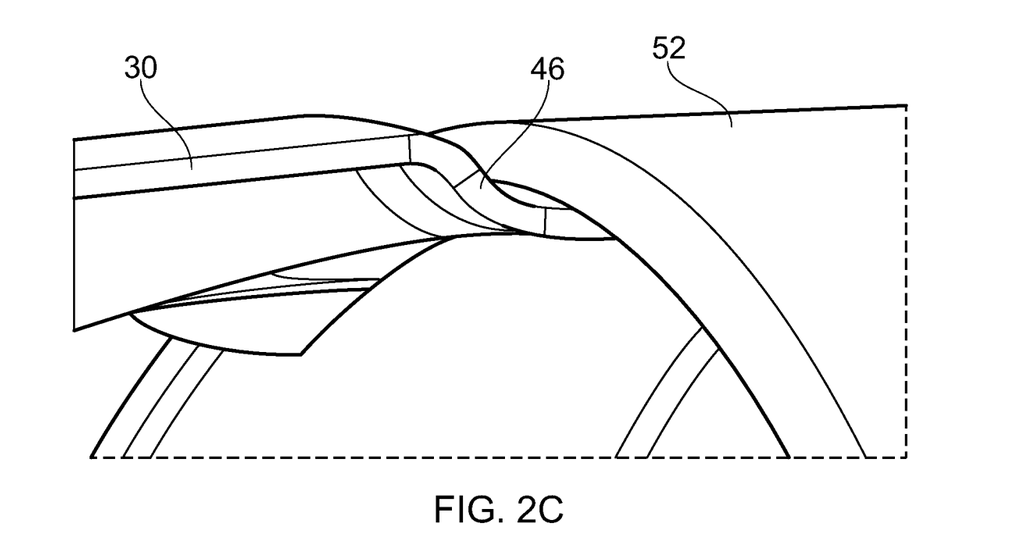
FIG. 2C is a perspective view showing the interface between the annulus filler of FIG. 2A and a rear seal of a fan.

FIGS. 2A to 2C shows an example of an annulus filler 30.

In use, the annulus filler 30 is fitted between adjacent fan blades (not shown) of a fan, such as the propulsion fan. The annulus filler 30 is installed on the fan so that air is drawn through the blades in the direction marked by arrow A. In the following description, the direction A will be referred to as the length of the annulus filler 30, and the front (up-flow) and rear (down-flow) of the annulus filler will be discussed to with reference to the direction of air flow A. The axis of rotation of the fan extends parallel to the direction A, on the underside of the annulus filler 30. The width of the annulus filler 30 will be considered circumferentially around the axis of rotation, and the height of the annulus filler 30 is considered radially from the axis of rotation.

The annulus filler 30 includes a top wall 32 (also referred to as a lid) which defines an air flow surface for air being drawn through the fan. The top wall 32 is inclined such that the height of the annulus filler 30 increases along its length.

Two axially placed support components 34, 36 are provided along the length of the top wall 32, in order to fix the annulus filler 30 to the rotor disc of the fan. Each support component 34, 36 comprises a pair of sidewalls 38 extending downward from an underside 40 of the top wall 32, and along a portion of the length of annulus filler 30. A cross member 42 joins the sidewalls 38 at the lower end of the sidewalls 38, such that the support components 34, 36 form hoops. The hoops then engage with hook formations (not shown) on the rotor disc.

A front lip 44 is provided at the front of the top wall 32, to fit under a spinner fairing or nose cone (not shown) located axially ahead of the annulus filler 30. The fan also includes an annular rear seal, extending axially at a rearward end of the fan disc, and positioned radially outward of the fan disc. As shown in FIG. 2C, a rear lip 46 is provided at the rear of the top wall 32, to fit under the rear fan seal 52. The front and rear lips 44, 46 ensure that the annulus filler 30 provides a smooth surface over which air can flow, and helps to retain the annulus filler 30 in place. The airflow surface extends from the spinner fairing or nose cone, over the annulus filler 30, onto the rear seal 52.

Two opposed sides 48a,b extend between the front lip 44 and rear lip 46. The two opposed sides 48a,b are provided with respective seal strips 50a,b that form seals with the fan blades. As best shown in FIG. 2B, the sides 48a,b are curved, such that the annulus filler follows the gap between adjacent blades, which are also curved along their length.

Figure 3A:
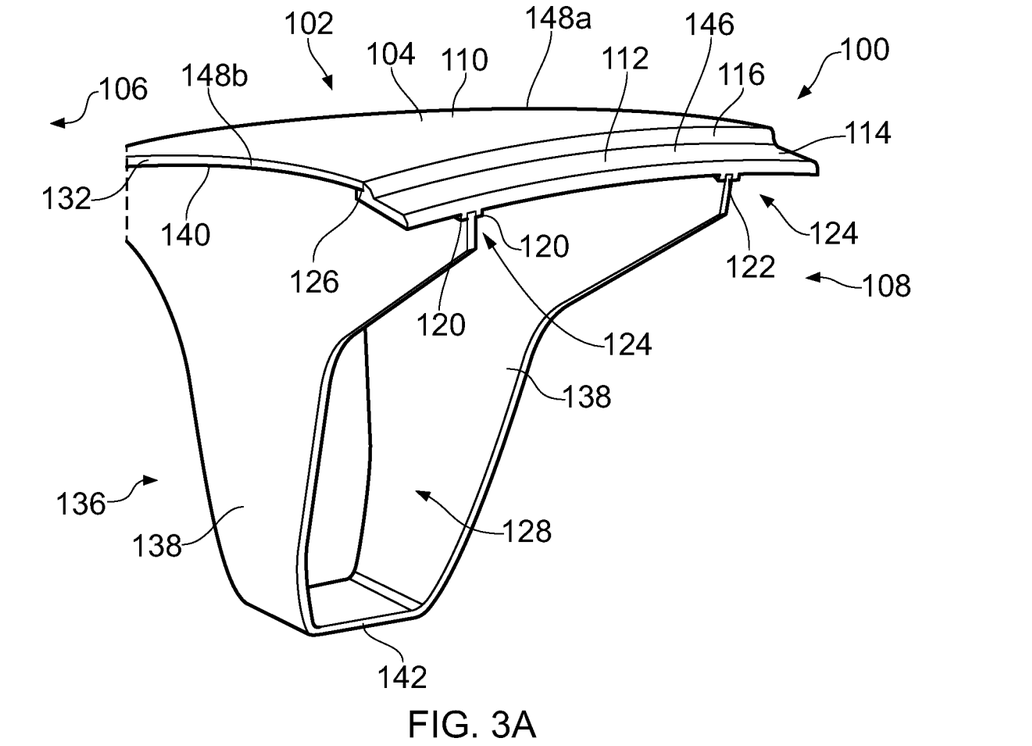
FIG. 3A is a rear perspective view of an annulus filler according to a first embodiment.

A composite annulus filler 100 according to a first embodiment of the disclosure will now be described, with reference to FIGS. 3A and 3B. The annulus filler 100 shown in FIG. 3A is the same as the annulus filler 30 shown in FIGS. 2A to 2C, unless stated otherwise. Where features of the annulus filler 100 in FIG. 3A are the same as the annulus filler 30 in FIGS. 2A and 2B, like reference numerals are used.

As with the annulus filler 30 of FIGS. 2A and 2B, the annulus filler 100 of FIG. 3A includes a top wall 132. A top surface 104 of the top wall 132 defines an air flow surface 102 for air being drawn through the fan. The annulus filler 100 of FIG. 3A also includes hoop shaped support components 134, 136 formed by sidewalls 138 extending from the underside 140 of the top wall 132, and cross members 142.

In use, air passes over the front end 106 (or up-flow) of the top wall 132 first, and then the rear (or down-flow) end 108. FIG. 3A shows the rear end 108 of the annulus filler 100 of the first embodiment in more detail. In this embodiment, the annulus filler 300 is formed of two separate parts 110, 112.

Figure 3B:
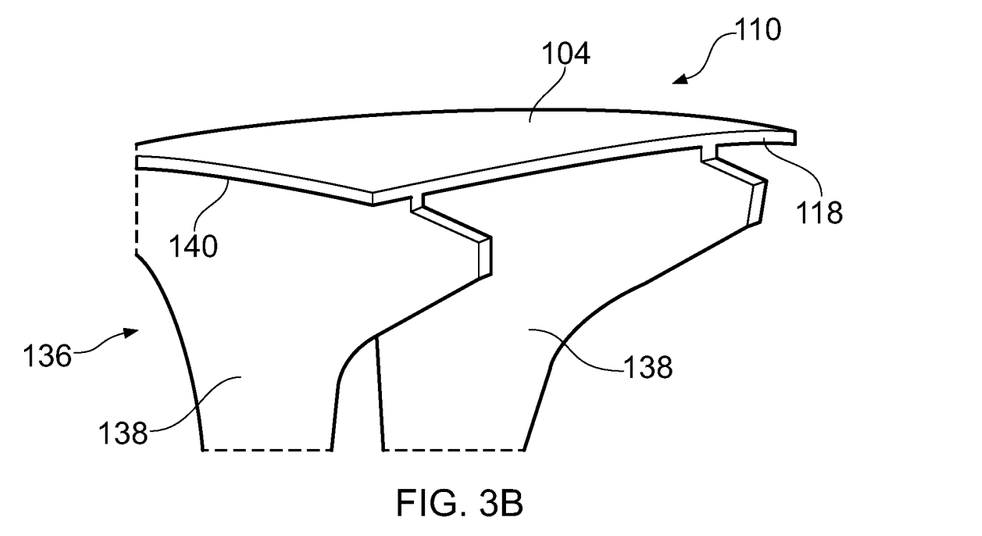
FIG. 3B is a rear perspective view of the body portion of the annulus filler of FIG. 3A.

The first part is a body portion 110, shown in FIG. 3B, and the second part of the body is a rear interface portion 112. The body portion 110 forms the top wall 132, support components 134, 136 and the front lip (not shown). The rear lip 146 is provided by the rear interface portion 112.

As will be discussed below in more detail, because the rear lip 146 is formed separately to the rest of the annulus filler 100, and fixed to the body portion 110, the body portion 110 can be formed by a moulding process using a simple mandrel or mould piece below the top wall 132. For example, the mandrel may be single piece or two piece. This makes the annulus filler 100 quicker and simpler to make. Furthermore, the top surface of the rear lip 146, which is more susceptible to wear than the rest of the annulus filler 100 (for example through friction between the rear lip 146 and the rear seal) can be replaced by replacing the rear interface portion 112, rather than the whole filler 100.

As shown in FIGS. 3A and 3B, the body portion 110 is of similar construction to the annulus filler 30 of FIGS. 2A and 2B. However, in the body portion 110, the down-flow end of the top wall 132 is missing. This means that the sidewalls 138 of the axially rearmost support component 136 extend beyond the rear end of the top wall 132.

In the example shown in FIG. 3A, the rear interface portion 112 is fixed to the body portion 110 at the rear end of the top wall 132. With the rear interface portion 112 in place, the top surface of the annulus filler 100 shown in FIG. 3A is substantially the same as the top surface of the annulus filler 100 shown in FIG. 2A and 2B.

In order to achieve this, the rear interface portion 112 includes a surface 114 extending parallel or substantially parallel to the top wall 132, but offset below it. This secondary surface 114 extends into (and hence underneath) the rear seal of the disc, to form the interface between the annulus filler 100 and the rear seal. This interface retains the annulus filler 100 in place, and may, as discussed below, form a seal with the rear seal. In use, the secondary surface 114 abuts the seal in a radial direction.

The rear interface portion 112 also include an abutment part 116. The abutment part abuts an end edge 118 of the top wall 132, and extends between the top surface 104 of the top wall 132 and the secondary surface 114. Therefore, the abutment part 116 and rear interface portion 112 form the rear lip 146 of the annulus filler 100. The annulus filler 100 may contact that rear seal during use (with movement and/or expansion of parts), at the abutment part.

Mounting projections 120 extend from the bottom side of the secondary surface 114. A first pair of mounting projections 120 are formed with a space 122 between them to receive a first sidewall 138 of the rear support component 136. A second pair of mounting projections 120 are formed with a space 122 between them to receive a second sidewall 138 of the rear support component 136. Therefore, the mounting projections 120 form mounting portions 124 that can be used to support the rear interface portion on the sidewalls 138 of the support components of the body portion 110.

Furthermore, at a front end of the rear interface portion, a bonding lip 126 is formed, extending under the top wall 132.

The rear interface portion 112 is bonded to the body portion 110 using adhesives or other suitable bonding materials. The bond may be achieved along any contact surfaces between the rear interface portion 112 and the body portion 110. This may be along the bonding lip 126, along the end 118 of the top wall 132, and/or along the top or sides of the support component sidewalls 138.

The body portion 110 can be formed of any suitable composite material. The material should be lightweight to reduce the overall weight of the annulus filler 100. For example, the body portion may be formed by a fibre reinforced material matrix. Examples of fibres and matrix materials that may be used in include woven carbon fibres, carbon fibres that are not woven, other fibres (woven or not) and epoxy resins.

The rear interface portion 112 may be made from the same material as the body portion 110, or a different material. The rear interface portion 112 should again be lightweight, to reduce the overall weight of the annulus filler 100. Furthermore, where adhesive bonding or other joining techniques are used, and the body portion 110 and rear interface portion 112 are formed of different materials, the rear interface portion 112 should be formed of a material compatible with the body portion 110, such that a bond may be formed. In some embodiments, the rear interface portion 112 is formed of a material arranged to form a seal with the rear fan seal.

In use, the annulus filler 100 shown in FIGS. 3A and 3B can be fitted and retained in between blades of a fan in a similar manner to the annulus filler 30 discussed in relation to FIGS. 2A to 2C. The support components 134, 136 are used to couple the annulus filler 100 to the rotor disc, the front lip (not shown) is retained under a spinner fairing or nose cone (not shown) located axially ahead of the annulus filler 30, and the rear lip 146, formed by the rear interface portion 112, is retained under a rear fan seal.

When the fan is in use in a turbine engine, the top side 104 of the top wall 132 forms an air flow surface 102, over which air (or any other gas passing through the fan blades) passes. The surface is a continuous surface from the spinner fairing or nose cone, over the top wall 132, and over the rear fan seal. In the example, shown, the part of the air flow surface 102 formed by the annulus filler 100 is formed by both the body portion 110 and the rear interface portion 112.

The region where the rear lip 146 extends under the rear fan seal is a region of high wear, during use. In at least some embodiments, the rear interface portion 112 is replaceable. This will be discussed in more detail below. Furthermore, in at least some embodiments, the rear interface portion 112 may be formed of a material that is as resistant to wear than the body portion 110, or more resistant. Furthermore, in some embodiments, the material of the rear interface portion 112 may be selected such that there is at least some friction between the rear interface portion 112 and the rear seal. This can provide further damping of vibrations.

Figure 4:
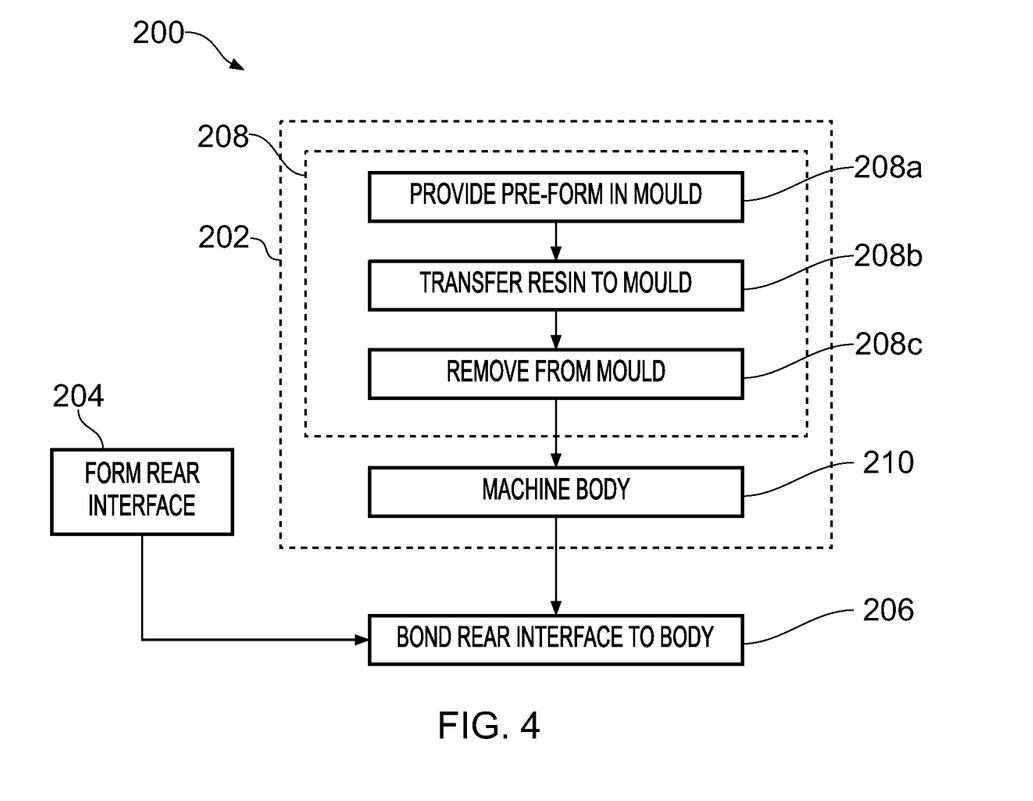
FIG. 4 illustrates a method of manufacturing an annulus filler as shown in FIGS. 3A and 3B, according an embodiment of the disclosure.

FIGS. 4 and 5 illustrate an example method 200 for manufacturing an annulus filler 100 as described above, using a resin transfer moulding technique.

Figure 5A:
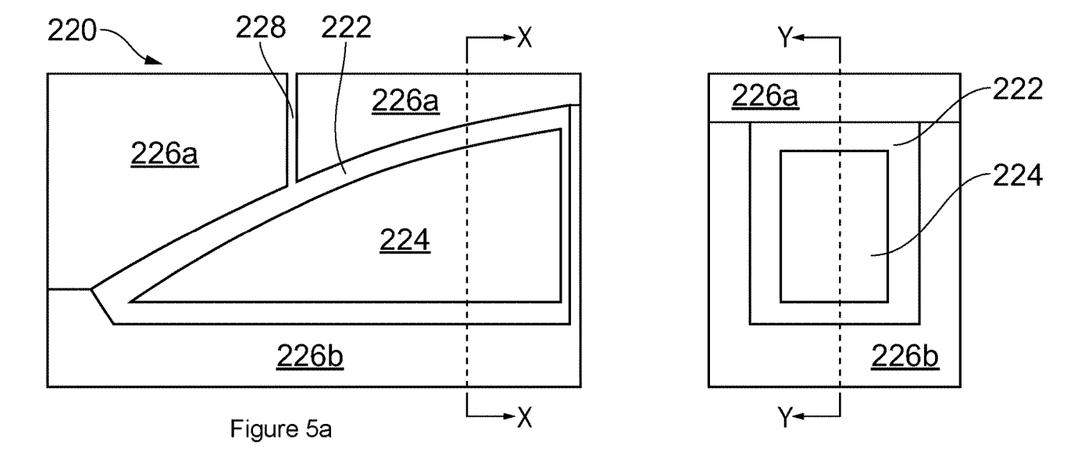
FIGS. 5(a) to (e) illustrate various stages of the method of FIG. 4.
Figure 5B:
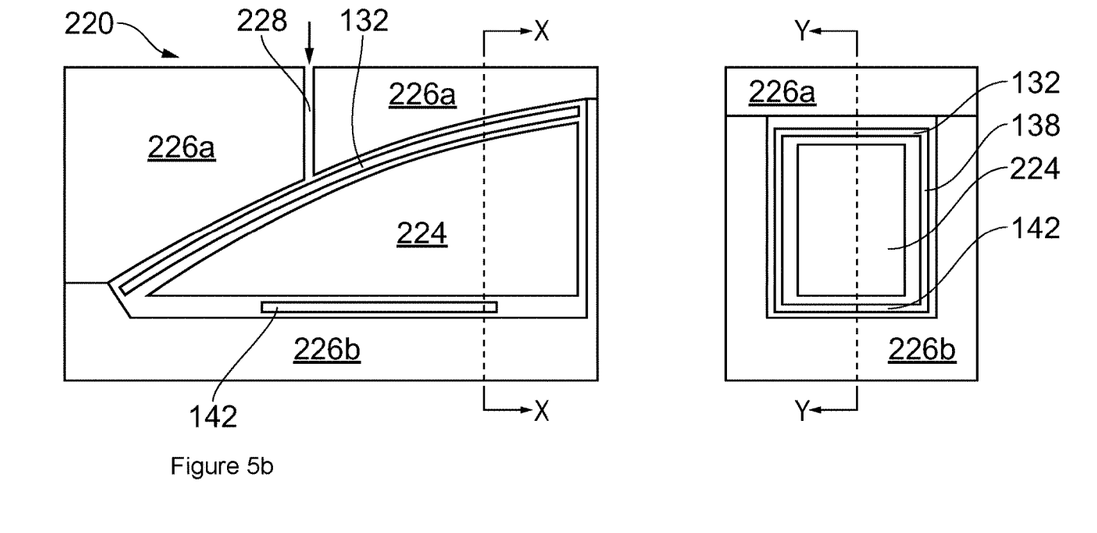
Figure 5C:
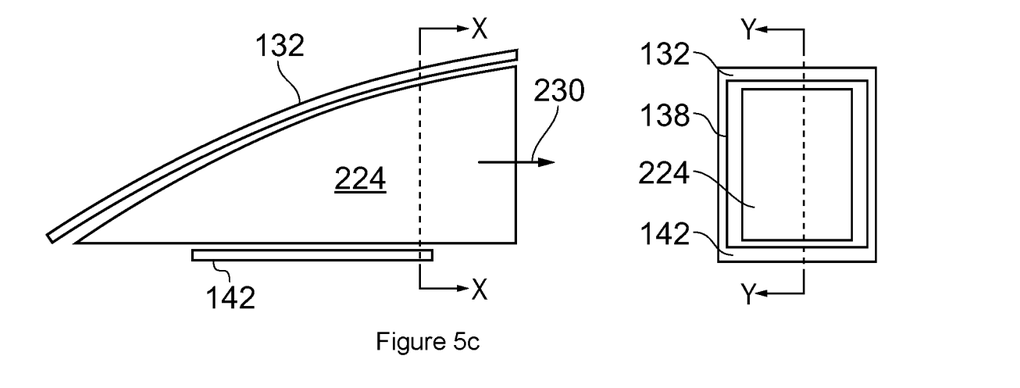

At a first step 202, the body portion 110 of the annulus filler 100 is formed. At a second step 204, the rear interface portion 112 of the annulus filler 100 is formed. The rear interface portion 112 is then bonded or fixed to the body portion 110 in a final step 206. In the first step 202, the body portion 110 is formed by a resin transfer moulding process 208. FIGS. 5(a) to 5(c) schematically illustrate the resin transfer moulding process 208. Figures (a) to (c) show a cut-through side view (left hand side) and a cut-through front view (right hand side) of the moulding process. The cut-through front view is taken through line X-X and the cut-through side view is taken through line Y-Y.

In resin transfer moulding (RTM), a mould 220 defines a cavity 222 in which the body portion 110 is formed. The cavity 222 is formed by an upper mould part 226a and a lower mould part 226b. A third mould part 224 (also referred to as a mandrel) is received in the cavity 222, to define the volume 128 under the top wall 132 of the body part 110. The mandrel 224 is supported above the base part 226b, by releasably securing it to the upper 226a and/or lower 226b mould parts at the ends of the body 110. The mould 220 does not define the separate support components 134, 136, but defines the sidewalls 138 and cross member 142 extending along the side of the body 110.

In use, the top wall 132 is formed on top of the mandrel 224. The sidewalls 138 of the support components 134, 136 are formed between the mandrel 224 and the sides extending upward from the lower mould part 226b, and the cross member 142 of the support components 134, 136 is formed between the mandrel 224 and the lower mould part 226a.

The upper mould part 226a may include a passage 228 for providing material into the cavity 222. It may also include one or more vent holes (not shown).

In a first RTM step 208a, a preform is provided in the cavity 222. The preform (not shown) may be any suitable material, such as, for example, interwoven fibres. The mould 220 may be assembled around the preform, to provide access to the cavity 222. The mould parts 224, 226 may be joined in any suitable manner, to provide a sufficient seal to retain the moulded material in the cavity 222.

In a second RTM step 208b, shown in FIG. 5(b), the resin is transferred to the mould, such that it infuses the pre-form and fills the cavity 222. The resin is then allowed to set. This may involve active heating and/or ventilation for setting, or may be by a simple hardening process.

The mould 220 is then disassembled around the body portion 110, to remove the body portion 110. The RTM process 208 includes the step 208c of removing the mandrel 224 from the volume 128 underneath the top wall 132. Since the top wall 132 does not include a rear lip, the mandrel 224 can simply be removed in the direction shown by arrow 230, shown in FIG. 5(c), away from the body porting 110, out from the rear end 108.

Figure 5D:
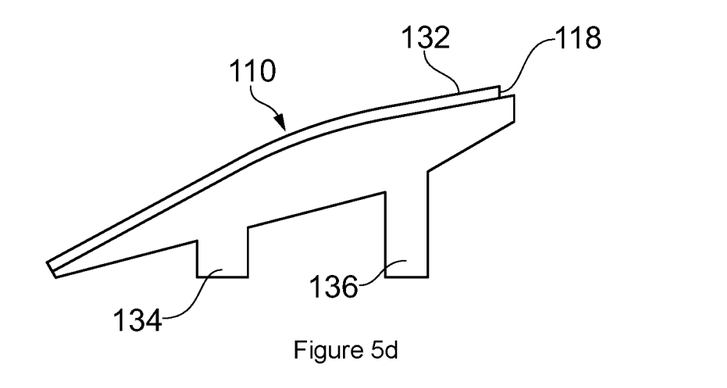
Figure 5E:
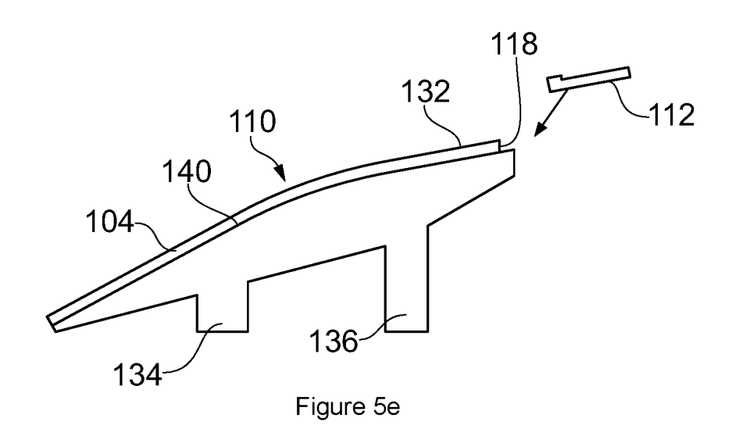

FIGS. 5(d) and (e) show the method steps after the resin transfer moulding process 208. FIGS. 5(d) and (e) show a side view of the body portion 110, during manufacture.

As discussed above, the body portion 110 is moulded without separately defined support components 134, 136, such that the sidewalls 138 and cross member 142 extend over the span between the support components 134, 136. Furthermore, the body portion 110 is formed with the top wall 132 extending over its full length. Therefore, the step 202 of forming the body portion also includes a step 210 of processing the body 110 to remove the sidewall 138 and cross member 142 material between the support components 134, 136 and removing a rear most part of the body portion 110. This provides separate support components 134, 136, and space for the rear interface portion 112, as shown in FIG. 5(d).

Removing the rear most part may include removing a portion of the top wall 132, and may optional include removing a portion of the sidewalls 138 of the support components 134,136. At least a portion of the sidewalls 138 of the support components is left, to fix the rear interface portion 112 to.

Any suitable method may be used to process the body portion 110 to remove the necessary parts. In at least some embodiments, machining may be used. Furthermore, it will be appreciated that typically, components formed by resin transfer moulding (and other moulding processes) may include some wastage around the edge of the component. The mould 220 for the body portion 110 may be arranged such that the portion that is removed from the top wall 132 is formed in the wastage areas.

The step 204 of forming the rear interface portion 112 may be carried out in any suitable manner. For example, the rear interface portion 112 may be moulded by any suitable moulding technique (such as injection moulding) using any suitable mould, it may be cast or machined, or it may be formed by additive manufacturing techniques.

Similarly, the step 206 of bonding the rear interface portion 112 to the body portion 110, shown in FIG. 5(e), may be carried out by any suitable method. For example, any suitable adhesive or bonding interface layer may be used. The step of bonding may involve applying a heat treatment or cure and/or pressure to help fix the parts 110, 112 together, for example using layers of a suitable epoxy adhesive.

As discussed above, the rear interface portion 112 is susceptible to wear. The rear interface portion 112 may be replaced, without having to replace the whole annulus filler 100. Replacement of a worn annulus filler 100 includes removing the annulus filler 100 from the fan and then removing the worn rear interface portion, forming 204 a replacement interface portion 112, and bonding the replacement rear interface portion 112 to the existing body portion 110, before replacing the annulus filler 100.

Figure 6:
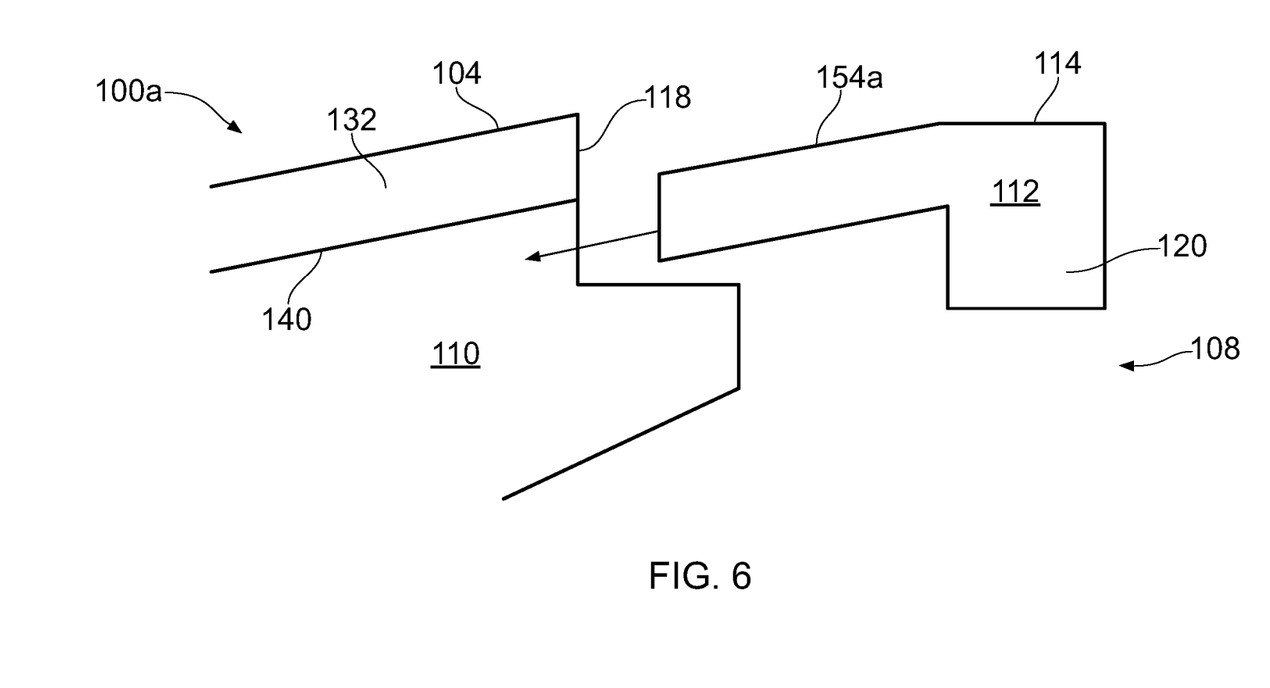
FIG. 6 schematically illustrates an annulus filler according to an alternative embodiment, in side view.
Figure 7:
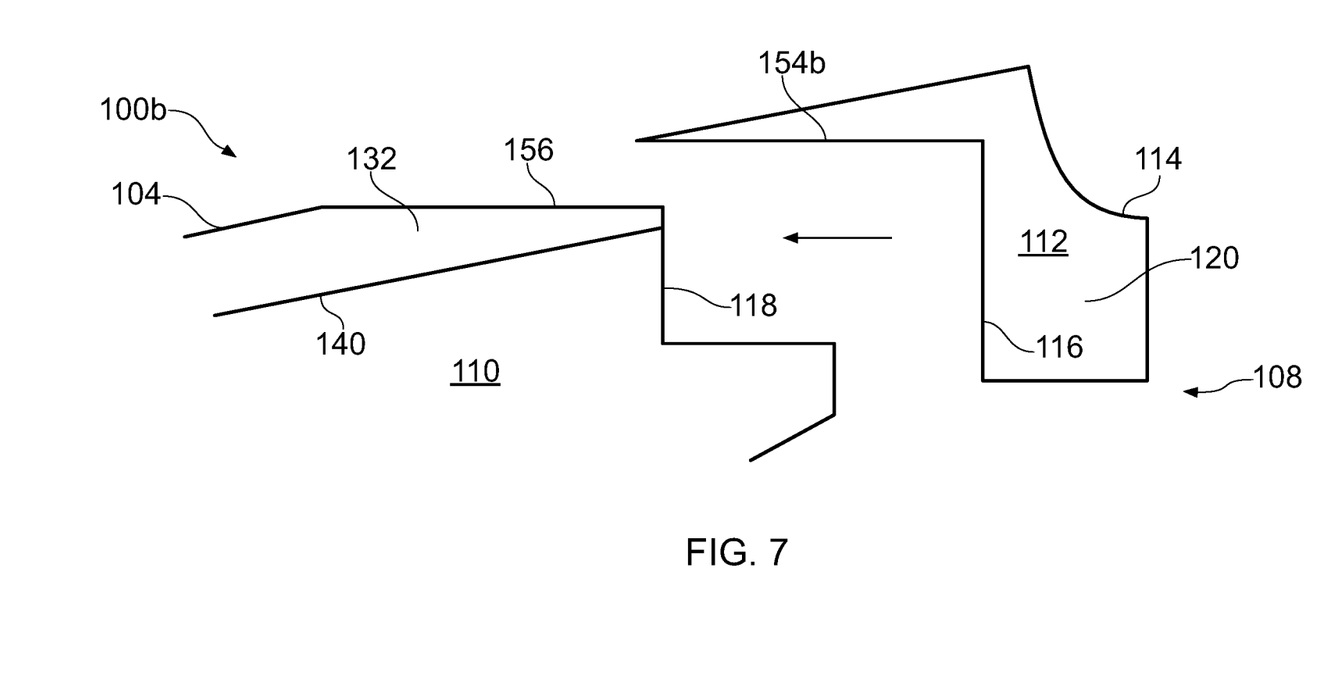
FIG. 7 schematically illustrates an annulus filler according to a second alternative embodiment, in side view.
Figure 8:
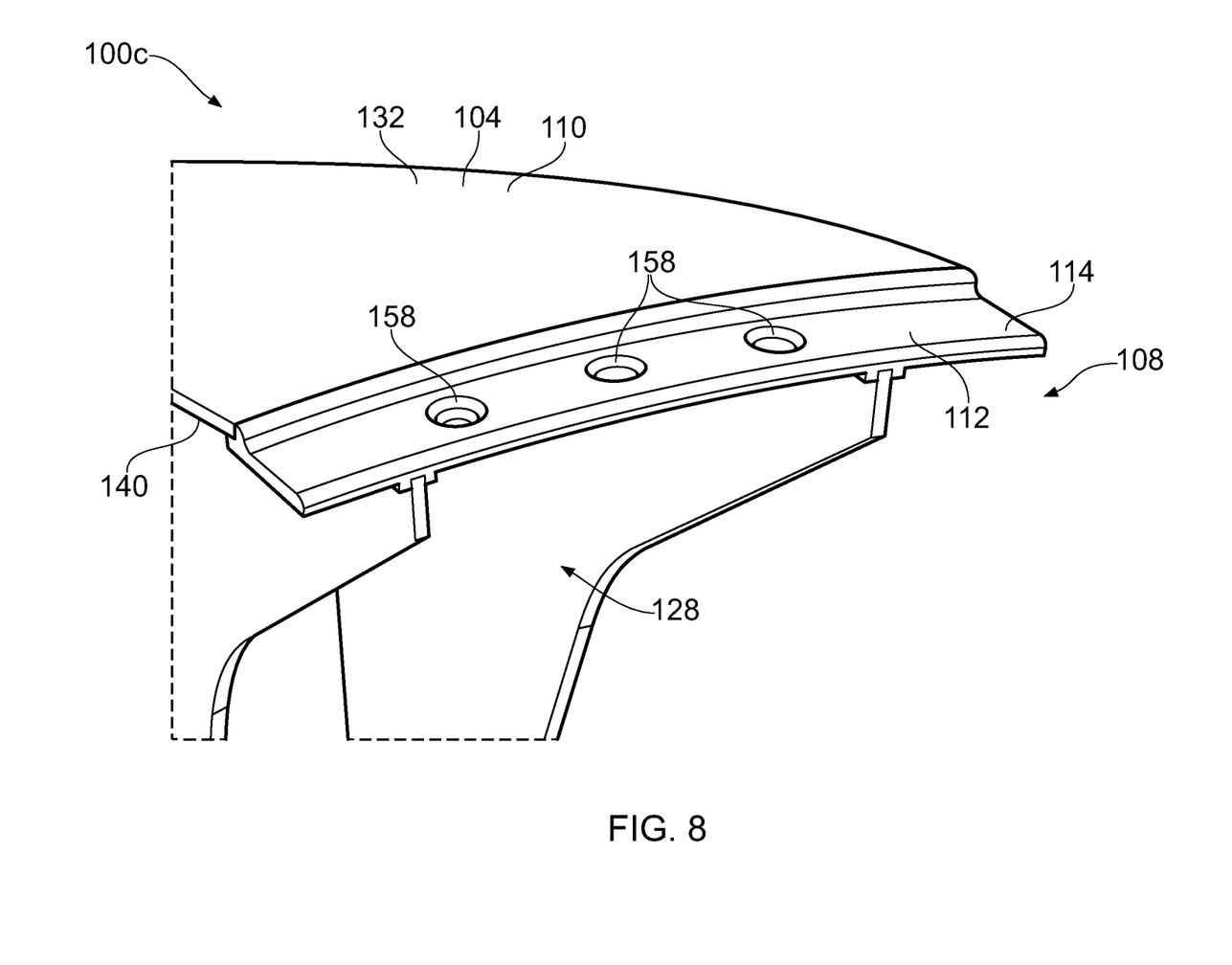
FIG. 8 illustrates an annulus filler according to a third alternative embodiment, in rear perspective view.

FIGS. 6 to 8 illustrate annulus fillers 100a-c according to alternative embodiments of the disclosure. The embodiments shown in FIGS. 6 to 8 are the same as the embodiment discussed above, unless stated otherwise. Similar reference numerals will be used for similar features in the embodiments shown in FIGS. 6 to 8. As with FIGS. 3A and 3B, FIGS. 6 to 8 only show the rear end 108 of the annulus filler 100a-c.

In the alternative embodiment shown in FIG. 6, the body portion 110 of the annulus filler 100a is identical to the body portion of the annulus filler 100 shown in FIG. 3A and FIG. 3B. However, in this embodiment, the rear interface portion 112 is different.

The rear interface portion 112 shown in FIG. 6 includes the secondary surface 114 extending parallel or substantially parallel to the top wall 132, but offset below it. In use, the secondary surface 114 extends into (and hence underneath) the rear seal 52 of the disc. Furthermore, the mounting projections 120 extend from the bottom side of the secondary surface 114, such that the rear interface portion 122 is able to be supported by the sidewalls 138 of the support components 134, 136.

However, in this embodiment, the abutment portion is omitted, and the bonding lip is replaced by a bonding surface 154a. The omission of the abutment portion means that the rear lip 146 is formed by the end edge 118 of the top wall 132 and the rear interface portion 112, and the air flow surface 102 is provided by the body portion 110 only. In this embodiment, the annulus filler 100a may be sized and/or positioned so that the rear seal of the engine does not touch the end edge 118 of the top wall 132 at any point during use.

The bonding surface 154a extends parallel or substantially parallel to the top wall 132, underneath it. Whereas the bonding lip only extends a short distance underneath the top wall 132 (of the same order of magnitude as the thickness of the top wall 132), the bonding surface 154a extends over a longer distance. For example, the bonding surface 154a can extend at least two or three times the thickness of the top wall 132, or more. When the rear interface portion 112 is fitted to the body portion 110, the bonding surface 154a contacts the underside 140 of the top wall 132. Therefore, the bonding surface 154a provides an extended contact area over which the bond between the body portion 110 and rear interface portion 112 can be formed.

Although the abutment portion 116 has been omitted, in some embodiments having a bonding surface 154a extending underneath the top wall 132, the abutment portion 116 may be included.

FIG. 7 shows a further alternative embodiment in which the rear interface portion 112 also includes an extended bonding area. In the embodiment shown in FIG. 7, the rear interface portion 112 includes a bonding surface 154b extending forwardly from an upper part of the abutment portion 116. In this embodiment, the bonding surface 154b extends over the top surface 104 of the top wall 132, and so, compared to the embodiment shown in FIGS. 3A and 3B, an increased area of the air flow surface 102 is formed by the rear interface portion 112.

In order to ensure a smooth air flow surface 102, a rear region 156 of the top wall on the body portion 110 is thinned. Furthermore, the bonding surface 112 is shaped such that, when fitted to the body portion 110, the top wall 132 continues into the rear interface portion 112 in a smooth path.

As with the embodiment shown in FIG. 6, the bonding surface 154b can extend at least two or three times the thickness of the top wall 132, or more. When the rear interface portion 112 is fitted to the body portion 110, the bonding surface 154b contacts the top side 104 of the top wall 132. Therefore, the bonding surface 154b provides an extended contact area over which the bond between the body portion 110 and rear interface portion 112 can be formed.

FIG. 8 shows a further alternative embodiment of an annulus filler 100c. The embodiment shown in FIG. 8 is identical to the embodiment shown in FIGS. 3A and 3B. However, in this embodiment, through-holes 158 are provided in the secondary surface 114 of the rear interface portion 112.

In the embodiment shown, the through-holes 158 are provided in the region between the sidewalls 138 of the rear support component 136, however, in other embodiments, the through-holes 158 may be provided over the full width of the annulus filler 100. Some of the air passing over the air flow surface 102 is directed in the gap formed between the rear lip 146 and the rear seal of the engine (see FIG. 2C). The through-holes 158 mean that this air can be directed into the cavity 128 beneath the top wall 132, to provide cooling to the rotor disc, and any other components underneath the annulus filler 100c. It will be appreciated that other shapes of orifice, such as ovals or slots, could also be used.

The arrangement of the annulus fillers 100 discussed above is given by way of example only. The person skilled in the art will appreciate that any annulus filler 100 having a lip 146 at the rear end may have the rear lip 146 formed on a rear interface portion 112, separate to a body portion 110.

In the above embodiments, one example of support components 134, 136 is given. However, any suitable mechanism may be used to fix the annulus filler 100 to the rotor disc. Furthermore, the rear interface portion may have any suitable shape and size in order to provide the rear lip 146.

In the above examples, adhesive or bonding is used to fix the rear interface portion 112 to the body portion 110. Such bonding may be provided along any contact surface between the body portion 110 and rear interface portion 112. Other methods such as plastic or metal welding may also be used. In embodiments with an extended bonding area, any suitable surface may be extended to provide the increased bonding area. Furthermore, in addition to or instead of the adhesive or bonding, mechanical fixings, such as bolts, rivets, clips, interengaging projections or the like may be used. These may be recessed into the upper surface, to ensure a smooth air flow surface 102.

Similarly, the method discussed above is given by way of example only. Any suitable method may be used for forming both the body portion 110 and the rear interface portion 112. For example, although the method discussed above relates to resin transfer moulding, any other moulding process with a rigid central mandrel may be used, such as autoclave moulding of pre-preg composite material.

In the embodiments discussed above, a portion of the top wall 132 is removed (for example by machining) to provide space for the rear interface portion 112, and a portion of the sidewalls 138 and cross member 142 is removed to form separate support components 134,136. In some examples, the body portion 110 may be moulded or formed with one or both of these features already formed.

In the embodiments shown, the annulus filler 100 engages with a rear seal of the fan, and forms a continuous air flow surface. In other examples, the annulus filler 100 may be arranged to engage with a windage shield, or any other rearward element that is connected to an axially rearward end of the fan disc and which helps to form a smooth airflow surface through the engine.

The annulus filler 100 can be used with standard fans (where the fan blades are formed separately to the disc, and then joined), or with blisks, where the blade and rotor disc are formed in a single integral unit.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

We claim:

1. An annulus filler for mounting to a rotor disc in a gas turbine engine, the annulus filler including:
   a body portion having:
      a top wall arranged to bridge the gap between two adjacent blades extending from the rotor disc and to define an air flow surface for air passing between the blades; and
      one or more support components extending from the top wall and configured to fix the annulus filler to the rotor disc; and
   a separately formed rear interface portion, fixed to the body portion adjacent to a down-flow end of the top wall,
   wherein the rear interface portion forms a lip projecting below the top wall;
   wherein the lip is configured to form an interface with a rear element of or coupled to the rotor disc, such that the top wall and rear element are flush to provide a smooth air flow surface; and
   wherein the one or more support components are located underneath the lip in order to support the lip.

2. The annulus filler of claim 1, wherein the lip includes a secondary surface extending in the same direction as the top wall of the body portion, and wherein the secondary surface extends underneath the rear element.

3. The annulus filler of claim 2, wherein the secondary surface includes one or more through-holes, such that air can pass from radially above the annulus filler to a volume formed beneath the top wall.

4. The annulus filler of claim 1, wherein the rear interface portion includes an abutment part, arranged to abut an end of the top wall, such that the lip is wholly formed in the rear interface portion.

5. The annulus filler of claim 1, wherein the rear interface portion includes a bonding surface extending parallel or substantially parallel to the top wall, and arranged to overlap the top wall.

6. The annulus filler of claim 5, wherein the bonding surface overlaps the top wall on an underside of the top wall.

7. The annulus filler of claim 5, wherein the bonding surface overlaps the top wall above the top wall, and wherein the top wall and bonding surface are arranged to provide a smooth air flow surface.

8. The annulus filler of claim 1, wherein the rear interface portion comprises mounting portions arranged to secure the rear interface portion to the body portion.

9. The annulus filler of claim 8, wherein a one of the one or more support components includes a pair of sidewalls extending from the top wall, wherein the sidewalls extend beyond a down-flow end of the top wall, and underneath the rear interface portion, and wherein each mounting portion includes a pair of projections arranged to receive one of the sidewalls between them.

10. The annulus filler of claim 1, wherein the body portion comprises a moulded composite material.

11. The annulus filler of claim 1, wherein the rear interface portion and body portion are formed of different materials.

12. The annulus filler of claim 1, wherein the rear interface portion has one or more of the following properties:
   the rear interface portion is formed of a material that forms a seal with the rear element;
   the rear interface portion is formed of a material that is compatible with a material of the body portion, in order to join the portions using non-mechanical fixing methods; and
   the rear interface portion is formed of a material that is at least as resistant to friction wear than a material of the body portion.

13. The annulus filler of claim 1, wherein the rear interface portion is fixed to the body portion along one or more contact surfaces between the rear interface portion and the body portion.

14. A gas turbine engine having a propulsion fan, one or more compressor stages and one or more turbine stages, wherein the propulsion fan includes a rotor disc, a plurality of blades arranged circumferentially around the rotor disc, and an annulus filler according to claim 1 provided between each of the blades.

15. A method of manufacturing an annulus filler, the method including:
   forming a body portion having: a top wall arranged to bridge the gap between two adjacent blades extending from the rotor disc and to define an air flow surface for air passing between the blades; and one or more support components extending from the top wall and configured to fix the annulus filler to the rotor disc;
   forming a separate rear interface portion; and
   fixing the rear interface portion to the body portion adjacent to a down-flow end of the top wall,
   wherein the rear interface portion forms a lip projecting downward from the top wall;
   wherein the lip is configured to form an interface with a rear element of or coupled to the rotor disc, such that the top wall and rear element provide a smooth air flow surface; and wherein the one or more support components are located underneath the lip in order to support the lip.

16. The method of manufacturing an annulus filler as claimed in claim 15, wherein forming the body portion comprises forming the body portion by a moulding process, using a rigid mandrel in a volume underneath the top wall.

17. The method of claims 16, wherein the mandrel comprises a single unitary piece, and wherein the method comprises:
   after forming the body portion and prior to fixing the rear interface portion to the body portion, withdrawing the mandrel in a down-flow direction, with respect to the top wall.

18. The method of claim 15, wherein forming the body portion includes:
   forming the body portion with the top wall extending to the down-flow end of the annulus filler; and
   removing a portion of the top wall, adjacent the down-flow end.

19. The method of claim 15, wherein fixing the rear interface portion to the body portion comprises fixing the rear interface portion to the body portion along one or more contact surfaces between the rear interface portion and the body portion.

* * * * *